Oct. 27, 1970  SATOSHI SEKIDO ET AL  3,536,531
LEAD STORAGE BATTERY AND A METHOD OF PRODUCING
THE ELECTRODES THEREOF
Filed May 21, 1969  8 Sheets-Sheet 7

United States Patent Office

3,536,531
Patented Oct. 27, 1970

3,536,531
LEAD STORAGE BATTERY AND A METHOD OF PRODUCING THE ELECTRODES THEREOF
Satoshi Sekido, Kadoma-shi, Hideyuki Ichimura, Osaka, and Sadao Kato, Neyagawa-shi, Japan, assignors to Matsushita Electric Industrial Co., Ltd., Osaka, Japan, a corporation of Japan
Filed May 21, 1969, Ser. No. 826,464
Claims priority, application Japan, May 30, 1968, 43/45,715; July 15, 1968, 43/50,315, 43/50,326; July 17, 1968, 43/62,169; July 18, 1968, 43/61,491; Nov. 14, 1968, 43/100,303
Int. Cl. H01m 39/00
U.S. Cl. 136—6                                10 Claims

ABSTRACT OF THE DISCLOSURE

A method of producing an electrode for a lead storage battery of high lead utilization, comprising the steps of rolling a lead alloy to a thickness of 0.1 to 0.5 mm., subjecting the rolled alloy plate to an electrooxidation in etching and thereafter reducing the same in sulfuric acid.

A cylindrical lead storage battery of small size and high capacity, in which the above-described electrodes are wound together with a separator to form a helical electrode group by making use of the flexibility of said electrodes, and lead storage batteries of other conventional forms incorporating said electrodes.

---

The present invention relates to a method of producing an electrode for lead storage batteries and to lead storage batteries utilizing said electrode.

The active material in the electrodes of lead storage battery is used only in a very thin surface layer of the electrode, the thickness of which is about 80 A. of the positive electrode and about 150 A. of the negative electrode at largest. The thickness of lead storage battery electrodes is becoming smaller and smaller as the demand for lead storage batteries of high output density is increasing, but has not successfully been reduced to 1 mm. or smaller. The electrodes of lead storage batteries are classified broadly into, paste-type, Tudor-type and a clad-type, but none of these types of electrode can be made in a thickness of 1 mm. or smaller by reason of the casting technique or the paste coating technique presently being employed in the production of these electrodes. Moreover, these electrodes are insufficiently flexible and must be used in the shape of a flat sheet. Therefore, box-shaped containers are used for incorporating these electrodes because with a cylindrical container, effective use of the space volume cannot be attained.

The present invention provides a method of producing a flexible, thin electrode of the described by rolling a lead alloy into the shape of a thin sheet and then subjecting said thin sheet to electrolytic etching. It may appear that the present method is analogous to the conventional method of producing the Tudor-type electrode, in which a lead alloy casting is electrolytically etched to obtain an electrode. However, it should be noted that an electrode of 1 mm. or smaller in thickness cannot be obtained from a casting material. In practice, the thickness of the electrode is normally 5 mm. or larger to provide for the formation of deep concaves in the surfaces of the electrode for the purpose of increasing the surface area. Moreover, by reducing the thickness of the electrode, there are brought about the disadvantages (1) that the core of the electrode tends to crack as a result of being unable to withstand extensive expansion and contraction which the electrodes undergoes in charging and discharging of the active material or the electrode tends to cause side shorting upon expansion thereof, and (2) that the production process becomes complicated because more consideration is required for improving the bond between the active material and the core or for the homogeneousness of the active material, as the thickness of the electrode becomes smaller, and such consideration is particularly required for the positive electrode. These are the reasons why an electrode of a thickness as thin as 1 mm. or smaller has not been materialized as yet.

It is, therefore, an object of the present invention to make it possible to obtain a very thin electrode core of a thickness as small as not larger than 0.5 mm. by pressure rolling a lead alloy and thereby to provide a thin electrode comprising the core which serves as a carrier lattice and a unitary surface layer which acts as active material, by electrolytically etching said electrode core using an etching compound and thereafter reducing the same in dilute sulfuric acid.

Another object of the invention is to provide a stress corrosion-proof, durable electrode having an increased stretchability and tensile strength and to facilitate the reduction in thickness of the electrode core in the rolling operation, by using a silver-containing lead alloy as the electrode material.

Still another object of the invention is to prevent growth of lead crystal on the negative electrode due to charging and discharging and thereby to prevent a reduction in capacity of the negative electrode, by forming $BaSO_4$ on the electrode subsequent to the electrolytic etching.

Still another object of the invention is to provide a small-sized, high capacity, lead storage battery by winding the positive electrode and the negative electrode, obtained in the manner described above, with a separator intervening therebetween to form a helical electrode group and disposing said electrode group in a battery container.

It is a further object of the invention to improve the charging and discharging characteristics of the battery described above, by adding a lignin sulfonic acid salt to the electrolyte and carrying out the initial charging at a rate higher than 1 hour rate.

These and other objects, features and advantages of the present invention will be apparent from the following description taken in conjunction with the accompanying drawings, in which.

Now, the present invention will be described in detail by way of example.

With reference first to the electrode material, the core of this type of thin electrodes tends to undergo corrosive cracking or to cause a side shorting as a result of being unable to withstand the expansion and contraction incident to charging and discharging. Moreover, consideration is necessary for producing a strong bond between the active material and the core. According to our experiments, it has been revealed that addition of a small amount of silver to the lead alloy is effective for increasing the tensile strength of the electrode and for preventing the electrical shorting caused by the expansion of the electrode and the corrosive cracking of the electrode.

Figure 1:
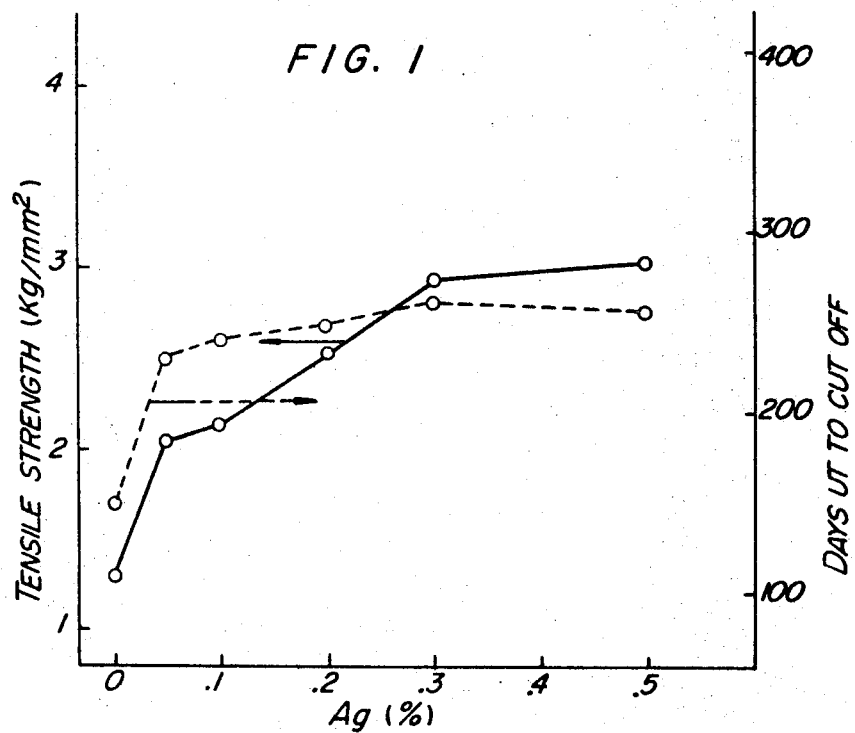
FIG. 1 is a diagram showing the relationship between the amount of Ag in a Pb-Ag alloy, and the tensile strength and corrosive failure of an electrode according to the invention.

Referring to FIG. 1, there is shown the relationship between the amount of Ag in the Pb-Ag alloy, and the tensile strength and corrosive cracking of the electrode made of said alloy. In the experiment, use was made of a sample electrode consisting of a sheet material having a thickness of 2 mm. and a width of 20 mm. the width of the electrode being reduced to 10 mm. at the central portion thereof. The corrosive cracking was expressed in terms of the number of days up to when the electrode cuts off when it was subjected to an anodic oxidation in sulfuric acid having a specific gravity of 1.28 under a load of 1.73 kg./cm.$^2$.

Figure 2:
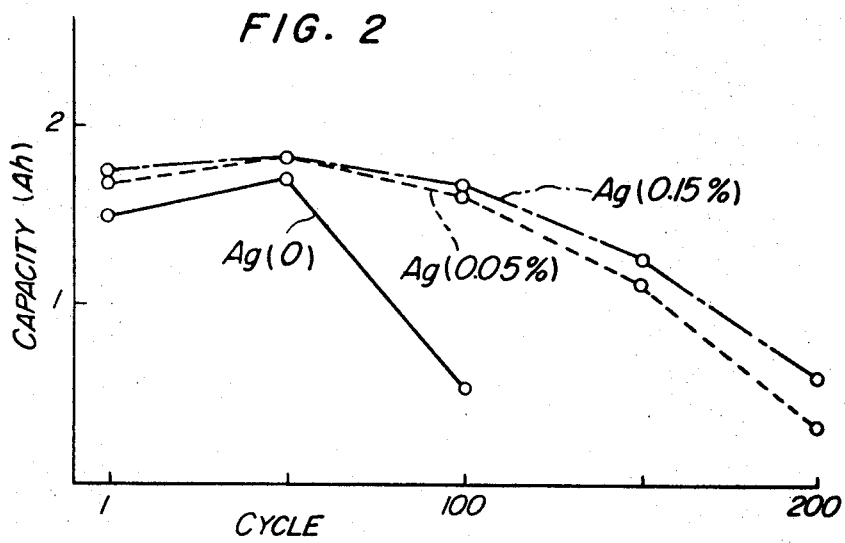
FIG. 2 is a diagram showing the relationship between the amount of Ag in a positive electrode made of a Pb-Ag alloy and the discharge characteristic of said positive electrode.

FIG. 2 shows the discharge characteristic of a positive electrode which was produced by subjecting a thin, rolled Pb-Ag alloy sheet having a thickness of 0.4 mm. and a size of 170 x 33 mm. to an electrolytic etching in a 0.026 M $KClO_4$-0.060 M $KClO_3$-1 N $H_2SO_4$ electrolyte at a temperature of 30° C. by conducting electricity for 20 hours at a current density of 14 ma./cm.$^2$ and thereafter reducing the same in a sulfuric acid having a specific gravity of 1.15 by conducting an electricity for 20 hours at a current density of 14 ma./cm.$^2$. As may be apparent from the diagram, use of the Pb-Ag alloy as the electrode material is advantageous in improving the bond between the active material and the core, in lessening the corrosion of the core which is caused incident to charging and discharging of the electrode, and, accordingly, in prolonging the service life of the electrode. A better result can be obtained as the proportion of silver increases but the addition of silver in an amount of 0.05% or more results in no substantial change. On the other hand, the amount of silver should be reduced from the economical standpoint. In view of the above, the proportion of silver is preferably from about 0.05 to 0.15%.

The method of producing an electrode according to the present invention will be practically explained hereunder:

First of all, a lead alloy of the prescribed composition is cast and rolled into a thin sheet. A thin sheet having a thickness of about 0.2 mm. can be obtained at normal temperature by rolling with a roll having a diameter of 15 cm. and rotating at the rate of 4-6 r.p.m. To obtain a thinner sheet, the roll temperature must be elevated.

When use is made of a solidified (or gelled) electrolyte, such as silica gel, a sufficient amount of the gel cannot be located between the electrodes, so that the characteristic of the battery is degraded with a large self-discharge. This can be prevented preferably by providing concaves and convexes or creases on the electrode proper. The table given below shows a comparison, in respect of discharge capacity and self-discharge, between batteries incorporating electrodes having a thickness of 0.3 mm., electrodes having a thickness of 1 mm. obtained by creasing the 0.3 mm. thick electrodes and electrodes having a thickness of 1.5 mm. obtained by creasing the 0.3 mm. thick electrodes, respectively. From the table, it will be seen that the performance of a battery can be improved by creasing the electrodes where silica gel is used as the electrolyte.

| Electrolyte | Liquid | Gel | Gel | | | | | |
|---|---|---|---|---|---|---|---|---|
| Thickness | 0.3 mm. | | 1 mm. | | | 1.5 mm. | | |
| Pitch mm. | | | 2 | 5 | 10 | 2 | 5 | 10 |
| Capacity (Ah): | | | | | | | | |
| 1 cycle | 1.5 | 1.3 | 1.5 | 1.5 | 1.5 | 1.5 | 1.5 | 1.5 |
| 50 cycles | 1.3 | 1.2 | 1.3 | 1.3 | 1.3 | 1.3 | 1.3 | 1.3 |
| 100 cycles | 0.8 | 0.6 | 0.7 | 0.8 | 0.8 | 0.7 | 0.7 | 0.7 |
| Self-discharge percent per month | 15 | 65 | 41 | 31 | 38 | 37 | 26 | 30 |

The thin plate of lead alloy obtained in the manner described above is then subjected to an electrolytic etching, using, for example, a lead dummy as the opposite electrode and further subjected to a cathodic reduction in dilute sulfuric acid.

In electrolytic etching, an electrolyte is used which consists of a mixed solution of perchlorate of alkali metal, e.g. $KClO_4$, chlorate of alkali metal, e.g. $KClO_3$ and sulfuric acid. In this case, the characteristic of the electrode is largely varied by the mixing ratio of the etching compounds and the sulfuric acid. Namely, with the amounts of the etching compounds increasing, more lead ions are dissolved in the electrolyte and less $PbO_2$ deposites on the electrode and the particles of $PbO_2$ becomes larger with more tendency to fall off the electrode. On the other hand, if the proportion of sulfuric acid becomes higher, the corrosive action is decreased and less $PbO_2$ is formed. In this view, it is suitable that the concentratiton of the etching compounds is from 0.05 to 0.10 M and that of sulfuric acid from 0.5 to 1 N. When only a chlorate is used as the etching agent, a dense $PbO_2$ layer is formed which tends to be delaminated from the electrode upon repeated charging and discharging, whilst when only a perchlorate is used, a fine $PbO_2$ layer is formed which also tends to be delaminated from the electrode. Therefore, it is preferable to mix both compounds in a suitable proportion, preferably in the proportion of 2:1.

Figure 3:
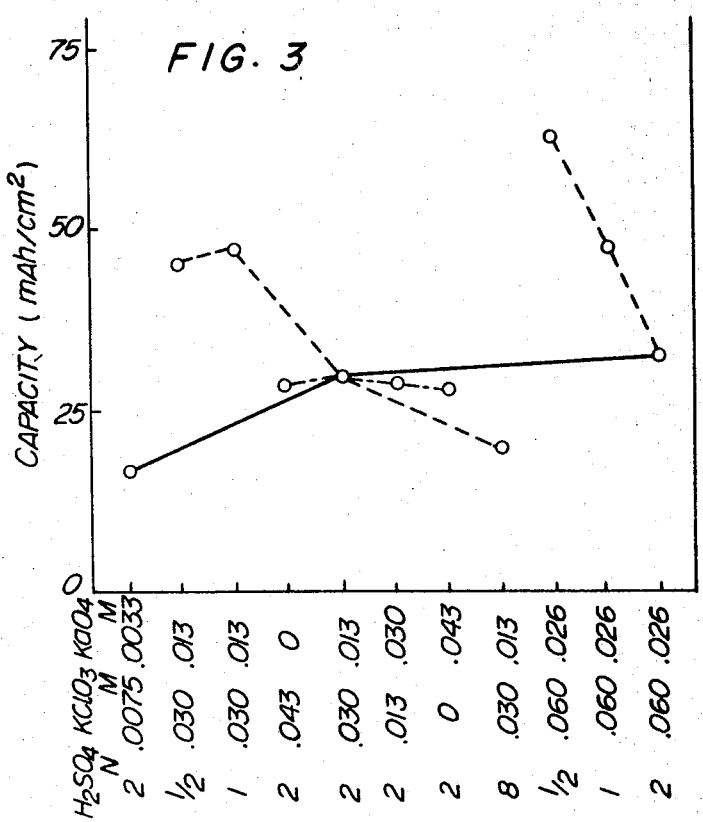
FIG. 3 is a diagram showing the relationship between the composition of an electrolyte used for electrolytic etching and the discharge capacity of the electrode obtained.

FIG. 3 shows the relationship between the discharge capacity of a battery incorporating a positive and negative electrodes which were produced by subjecting a 0.4 mm. thick Pb-Ag (0.15%) plate and a 0.35 mm. thick Pb-Ag (0.05%) plate to electrolyte etching in a $KClO_4$-$KClO_3$-$H_2SO_4$ system electrolyte at a temperature of 30° C., a current density of 14 ma./cm.$^2$ and a current conducting rate of 280 ma. h./cm.$^2$ and then electrolytically reducing said respective plates in dilute sulfuric acid, and the composition of said electrolyte.

Figure 4:
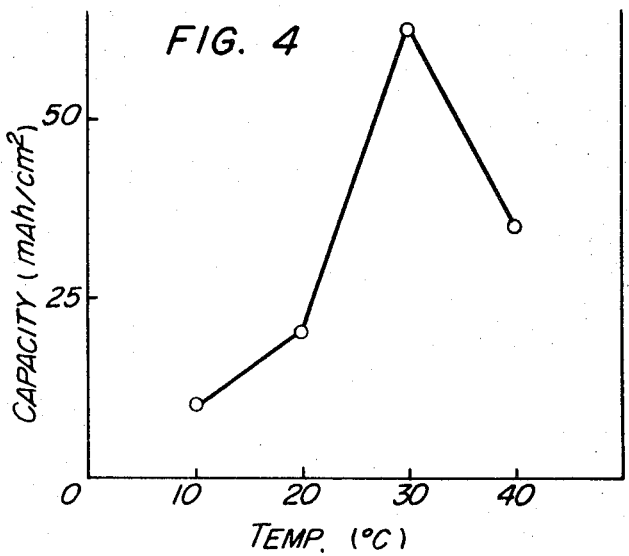
FIG. 4 is a diagram showing the relationship between the electrolytic etching temperature and the discharge capacity of the electrode.

FIG. 4 shows the relationship between the discharge capacity of a battery incorporating a positive and negative electrodes which were produced by subjecting the same thin alloy plates as described above to an electrolytic etching in a 0.026 M $KClO_4$-0.006 M $KClO_3$-½ N $H_2SO_4$ system electrolyte at a current density of 14 ma./cm.$^2$ and a current conducting rate of 280 ma. h./cm.$^2$ and then electrolytically reducing the respective plates in dilute sulfuric acid, and the temperature at which the electrolytic etching was conducted. As may be seen from the diagram, the electrodes are etched more heavily and discharge capacity becomes larger, with the etching temperature elevating, but the discharge capacity becomes rather smaller when the etching temperature exceeds 30° C.

Figure 5:
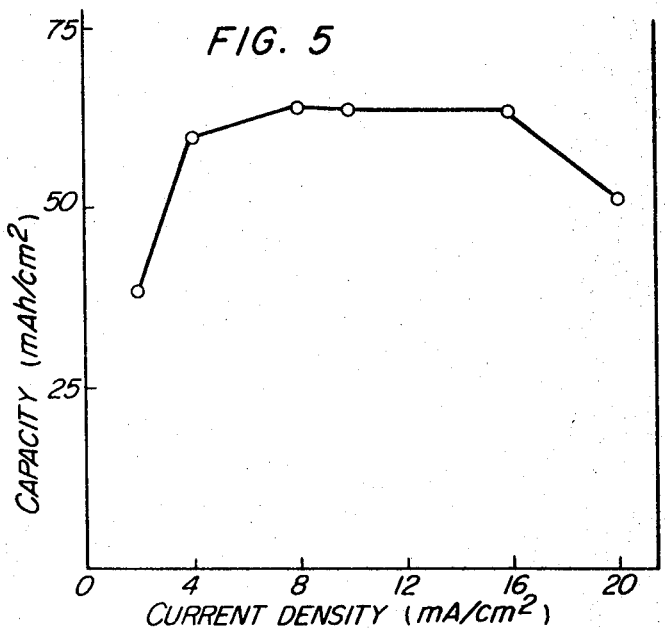
FIG. 5 is a diagram showing the relationship between the current density for the electrolytic etching and the discharge capacity of the electrode obtained.
Figure 6:
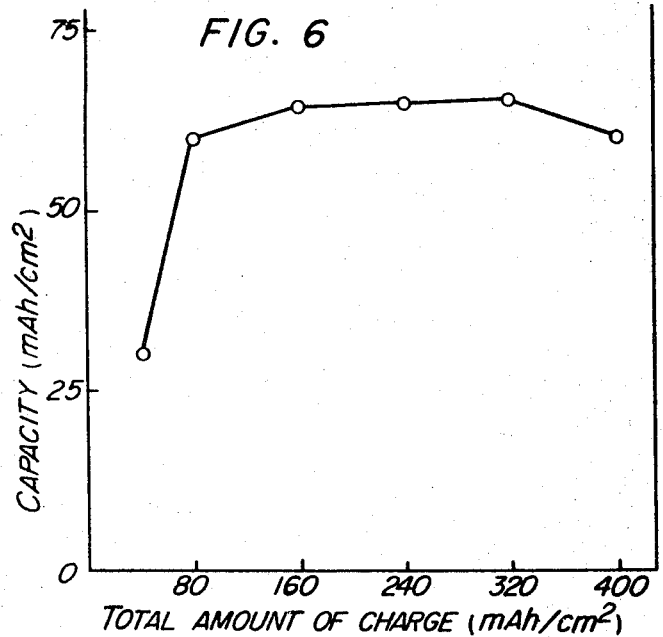
FIG. 6 is a diagram showing the relationship between the amount of electricity used for the electrolytic etching and the discharge capacity of the electrode obtained.

In FIG. 5 there is shown the relationship between the discharge capacity of a battery incorporating a positive and negative electrodes which were produced by subjecting the same thin alloy plates as in the case of FIG. 3 to an electrolytic etching in a 0.26 M $KClO_4$-0.060 M $KClO_3$-½ N $H_2SO_4$ system electrolyte at a temperature of 30° C. and a current conducting rate of 320 ma. h./cm.$^2$ and then electrolytically reducing the respective plates in dilute sulfuric acid, and the current density at which the electrolytic etching was conducted. FIG. 6 shows a discharge capacity change with respect to the current conducting rate when the electrolytic etching was conducted under the same conditions as in the case of FIG. 6 but at a constant current density of 12 am./cm.$^2$. From these results, it will be seen that the electrolytic etching is preferably conducted at a current density in the range from 8 to 16 ma./cm.$^2$ and at a current conducting rate in the range from 160 to 320 ma. h./cm.$^2$.

Figure 7:
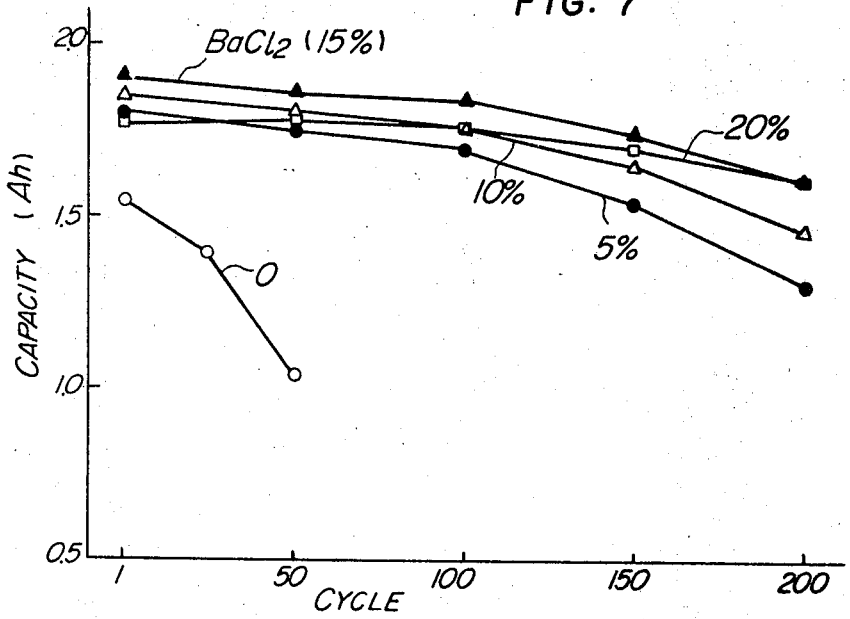
FIG. 7 is a diagram showing the relationship between the concentration of an aqueous $BaCl_2$ solution used for the formation of $BaSO_4$ on a negative electrode and the discharge characteristic of a battery incorporating the negative electrode.

The electrodes having been subjected to electrolytic etching in the manner described above are reduced to metallic lead in dilute sulfuric acid. The electrolytic reduction is preferably performed in $H_2SO_4$ having a specific gravity of 1.15 by conducting electricity at a current density of 14 ma./cm.$^2$. The plate to be used as negative electrode is, prior to the electrolytic reduction, immersed in a barium salt, e.g. an aqueous solution of $BaCl_2$, for incorporating $BaSO_4$ therein. Namely, after the electrolytic etching, the plate was washed with water to remove the electrolyte therefrom and then immersed in the aqueous solution of $BaCl_2$ for several hours, and thereafter transferred into sulfuric acid having a specific gravity of 1.15 to form $BsSO_4$ and subjected to a cathodic reduction for 20 hours at a current density of 14 ma./cm.$^2$, as in the case of the plate for positive electrode, to remove $Cl^-$ ion, whereby a negative electrode is obtained. The amount of $BaSO_4$ formed on the plate in the process described above depends mainly on the concentration of the aqueous $BaCl_2$ solution and is preferably in the range from about 0.45 to 0.90 M/l. from the standpoint of electrode performance. FIG. 7 shows the relationship between the discharge performance of a battery in which the negative electrode obtained in the manner described above is used together with a positive electrode, and the concentration of the aqueous $BaCl_2$ solution used for the formation of $BaSO_4$ on the negative electrode.

Figure 8:
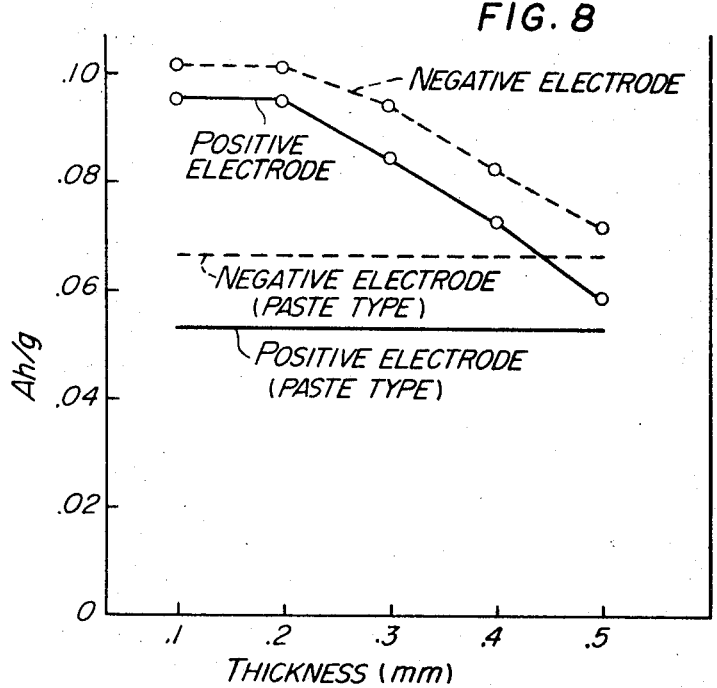
FIG. 8 is a diagram showing the relationship between the discharge capacity per unit weight of an electrode produced according to the present invention and the thickness of Pb alloy thin plate used as the electrode material.
Figure 9:
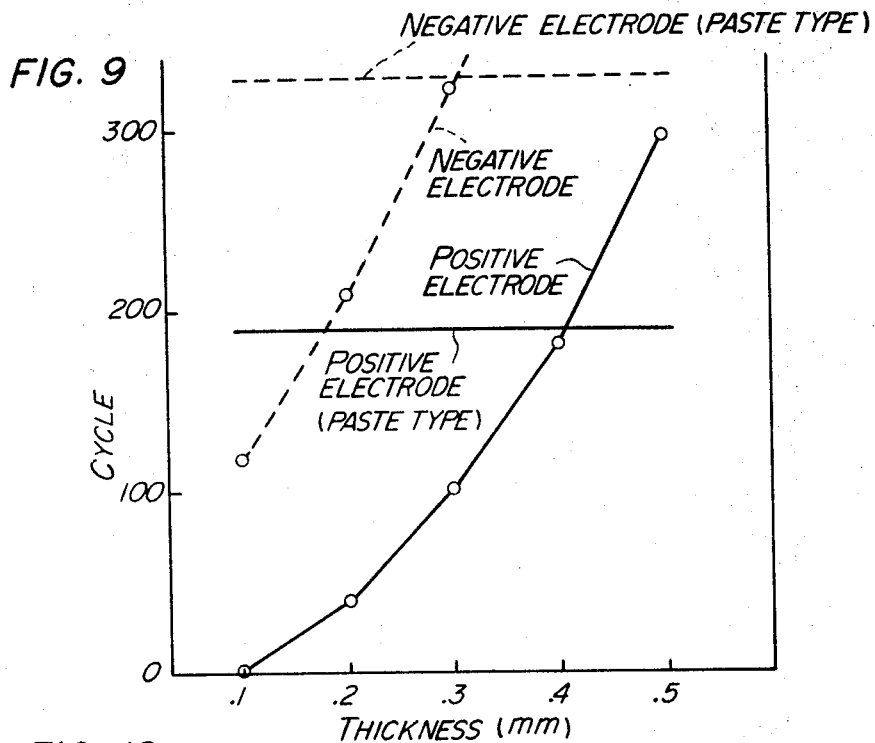
FIG. 9 is a diagram showing the relationship between the thickness of the electrode material and the cycle characteristic of the electrode.

In FIG. 8 there is shown, in comparison with a conventional 1.5 mm. thick paste-type electrode, the relationship between the thickness of a positive electrode and a negative electrode and the utilization of lead thereof, said positive electrode being produced by subjecting a rolled Pb-Ag (0.10%) plate to an electrolytic etching in a 0.06 M $KClO_4$-0.026 M $KClO_3$-1 N $H_2SO_4$ system electrolyte at a temperature of 30° C. and a current density of 14 ma./cm.$^2$ for 20 hours and thereafter to an electrolytic reduction in $H_2SO_4$ having a specific gravity of 1.15 at the same current density, and said negative electrode being produced by forming $BaSO_4$ on a plate which has been electrolytically etched in the same manner as above described and then subjecting said plate to electrolytic reduction. FIG. 9 shows the relationship between the thickness of the same positive and negative electrodes as described above and the life cycle thereof, in comparison with the paste-type electrode.

It will be seen in these diagrams that the utilization of lead is higher than that of the conventional paste-type electrode, in both the positive and negative electrodes when the thickness thereof is 0.5 mm. or smaller, and that both the positive and negative electrodes have the same service life as that of the 1.5 mm. thick paste-type electrode, when the thickness of the positive electrode is 0.4 mm. or larger and the thickness of the negative electrode is 0.3 mm. or larger.

As described above, the utilization of lead is related to the thickness of the electrode but when the etching is effected beyond a certain depth, this utilization can no longer be raised. In view of the lead utilization and the mechanical strength, the electrode thickness is preferably in the range from 0.1 to 0.5 mm.

After the electrolytic reduction, the positive electrode must be converted from the state of Pb to the active material of $PbO_2$ by the initial charging and in the process of such conversion $PbSO_4$ is formed. If the current density for the initial charging is too small, only oxygen gas is generated with substantially no $PbO_2$ formed.

Figure 10:
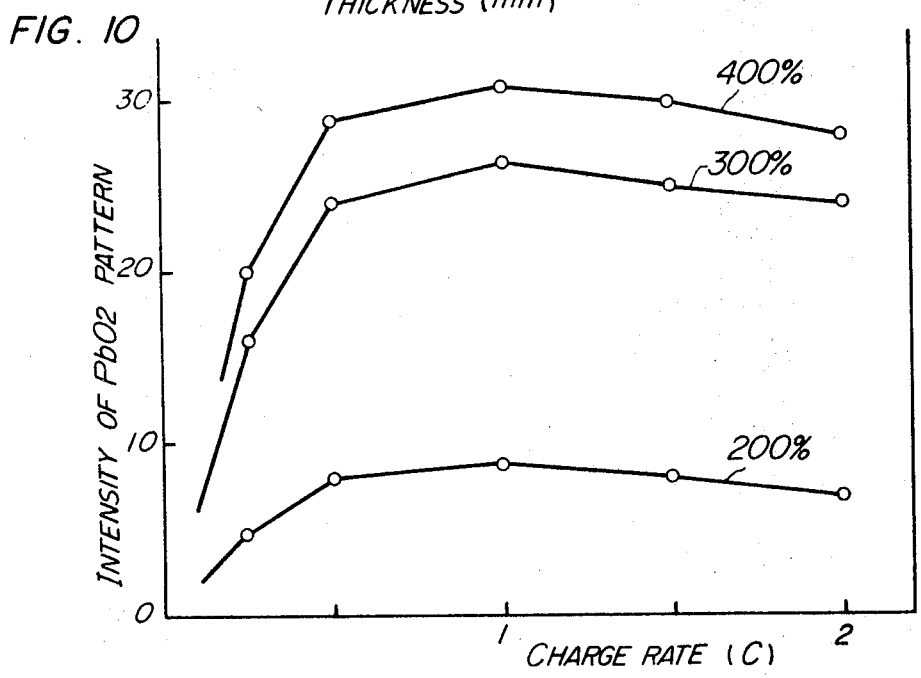
FIG. 10 is a diagram showing the relationship between the current density for the initial charging and the amount of $PbO_2$ formed on the positive electrode.

FIG. 10 shows the relationship between the current density for the initial charging and the amount of $PbO_2$ formed on the positive electrode (in terms of a relative intensity of X-ray diffraction image of $PbO_2$). A current density of 1 hour rate or higher is required for the formation of $PbO_2$ from $PbSO_4$. The initial charging is done preferably by conducting electricity of 400% of the discharge capacity at 1 hour rate or higher at the outset and then conducting the electricity for 5 to 10 hours at the current density of 10 to 20 hour rate. Addition of lignin to the electrolyte for the initial charging is effective for preventing a volumetric reduction of the negative electrode which would otherwise result from the growth of negative electrode crystals, incident to the initial charging, along with the formation of $BaSO_4$ on the negative electrode. Lignin is added to the electrolyte in the form of a sulfonate, e.g. sodium lignin sulfonate. The sodium lignin sulfonate is added preferably in an amount of 0.5 to 1 g./l.

Figure 11:
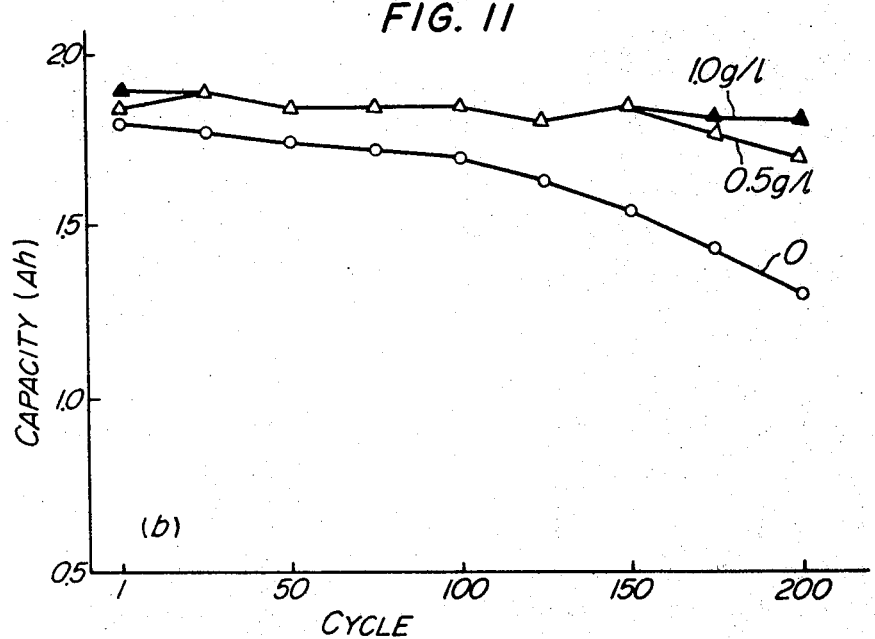
FIG. 11 is a diagram showing the relationship between the discharge characteristic of a lead storage battery incorporating an electrode obtained according to the present invention and the amount of sodium lignin sulfonate added to the electrolyte.

FIG. 11 shows the relationship between the amount of sodium lignin sulfonate added to the electrolyte and the battery performance. The concentration of the aqueous $BaCl_2$ solution used for the formation of $BaSO_4$ on the negative electrode is 15 weight percent. Incidentally, the electrolytes for initial charging of the negative electrodes, the performances of which are shown in FIGS. 3 to 6, 8 and 9 discussed above, all have 1 g./l. of sodium lignin sulfonate added thereto.

Figure 15:
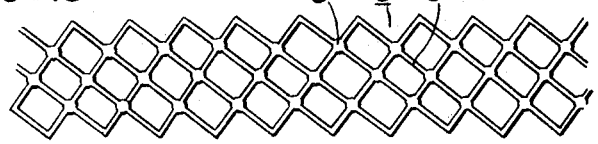
FIG. 15 is a fragmentary front elevation of the spacer.

Now, a preferred method of constructing a battery using the thin plate-type electrodes obtained in the manner described hereinabove, will be explained hereunder: Even though the thickness of the electrodes is reduced, a high output density of the battery cannot be obtained unless the separator used is thin in thickness. As the separator, it is preferable to use one which is produced by adding a diatomaceous earth powder having a grain size of 40μ or smaller to an emulsion of vinyl chloride-vinyl acetate copolymer in acetone at the proportion of 200 parts of the former to 100 parts of the resin component in said emulsion, dispersing said powder sufficiently in said emulsion in a ball mill, coating the resultant mixture on a non-woven fabric of polyvinyl chloride through a calender roll and drying the coated fabric. A sufficient strength of the separator can be obtained when the thickness of the polyvinyl chloride non-woven fabric and the coating thereon are 0.20 mm. or larger and 0.25 mm. or larger respectively. By providing on the positive electrode side of the separator a spacer as shown in FIG. 15, which comprises polyethylene wires 6' of about 0.2 mm. in diameter interlaced at a pitch of 3 to 5 mm. and heat-bonded with each other at the intersections 6", oxidation of the separator can be prevented and, therefore, the separator is durable for practical use. Such spacer is advantageous in enhancing the performance of the electrode by holding a large amount of electrolyte on the positive electrode side thereof.

Where a battery container used is rectangular in shape, the electrodes and the separator and the spacer are laminated alternately to form an electrode group, whereas where the battery container is cylindrical in shape, the electrodes, the separator and the spacer can be wound helically by making use of the flexibility thereof.

Figure 16:
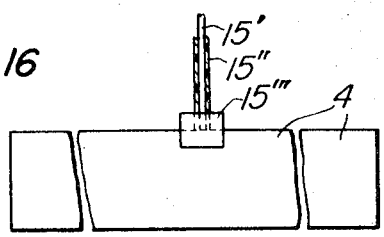
FIG. 16 is a front elevation showing the manner of connecting a lead wire to the electrode.
Figure 17:
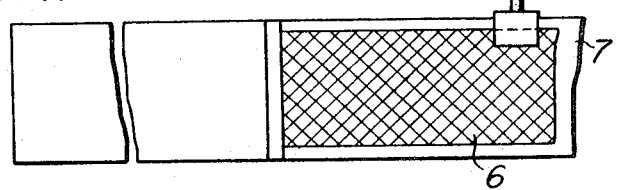
FIG. 17 is a fragmentary front elevation of the positive electrode with the spacer applied thereto.

As the electrode is reduced in thickness, a difficulty is encountered in connecting a lead wire thereto because the lead wire tends to be subjected to heavy corrosion at a portion in contact with the meniscus of the electrolyte and cut thereat. In order to overcome such difficulty, it is recommendable to employ such an inexpensive method wherein, as shown in FIGS. 16 and 17, a lead wire 15', welded to the electrode 4, is covered with an acidproof synthetic resin tube 15", e.g. polyvinyl chloride tube, and further the weld between the lead wire and the electrode is covered with a polyvinyl chloride tape 15'".

Figure 12:
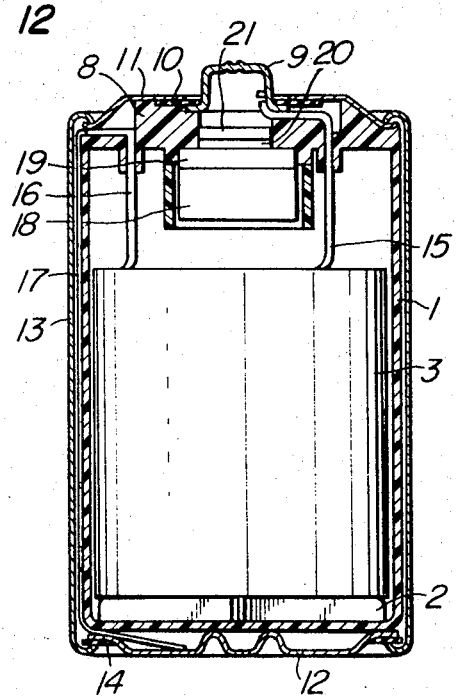
FIG. 12 is a vertical sectional view illustrating an embodiment of the cylindrical lead storage battery according to the invention.
Figure 14:
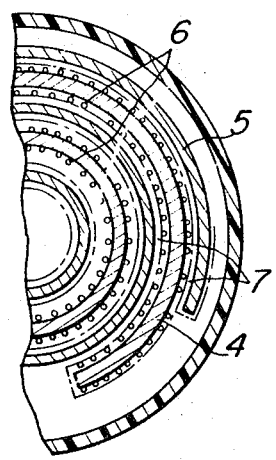
FIG. 14 is a fragmentary plan view of the electrode group.

An embodiment of the cylindrical lead storage battery incorporating thin electrodes according to the present invention is shown in FIG. 12. Referring to FIG. 12, numeral 1 designates a cylindrical container made of polyethylene and provided with three saddles 2 at the bottom thereof, and 3 designates an electrode group comprising a positive electrode 4, a negative electrode 5, a spacer 6 and a separator 7 which are wound helically as shown in FIG. 14. Numeral 8 designates a sealing closure member of polystylene material, 9 a positive electrode terminal cap, 10 an insulating ring, 11 a metallic closure member, 12 a negative electrode terminal plate, 13 a metallic outer casing and 14 an insulating ring. A positive lead 15 and a negative lead 16 are respectively covered with a polyvinyl chloride tube and extend through the closure member 8. The positive lead 15 is connected with the positive electrode terminal cap 9, whilst the negative lead 16 is connected with the negative electrode terminal plate 12 through an insulation-coated band-like lead 17.

The closure member 8 forms a cavity at the central portion thereof in which is disposed a pressure-molded catalyzer 18 consisting of an artificial graphite powder carrying on the surface thereof a metal catalyst, such as palladium, and a powder, such as of polyethylene tetrafluoride, said catalyzer serving to combine the oxygen and hydrogen, generated during charging of the battery, to form water. On top of the catalyzer 18 are provided a molded body 19 of graphite powder and polyethylene tetrafluoride, and a polystyrene film 20, through which oxygen is supplied to the catalyzer 18 from the outside so as to prevent the pressure of hydrogen, which is not combined with oxygen, from building up excessively high in the interior of the battery and to prevent the electrolyte from leaking to the outside through the catalyzer 18. A layer 21 which is formed by coating and drying a mixture of litharge, glycerin and water, is provided for the purpose of absorbing and fixing the electrolyte leading to the outside.

The electrode of this invention obtained by electrolyzing a lead alloy thin plate of 0.5 mm. or smaller in thickness has the advantage that the utilization of lead is high, as shown in FIG. 8. However, if the thickness of a positive electrode according to the invention is not larger than 0.4 mm. and the thickness of a negative electrode of the invention is not larger than 0.3 mm., there is the tendency that the service lives of the electrodes are shorter than that of the paste-type electrode, as shown in FIG. 9. This can mainly be attributed to the fact that the strength of the electrodes is reduced. Such reduction in service life can be improved considerably by the use of a mixture of silica gel and sulfuric acid as the electrolyte. With a commercial silica sol having a particle size of 10 to 20 m$\mu$, 1 to 2 g. of sulfuric acid is required per 1 g. of silica sol to prepare silica gel. In constructing a battery, an amount of sulfuric acid necessary for discharge is required, in addition to the amount required for the formation of silica gel. This sulfuric acid is free in its state and if the silicic acid component in the material sol is too large in amount, the concentration of the free sulfuric acid becomes undesirably high impairing smooth charging of the negative electrode, whilst if the amount of the silicic acid component is too small, flow of the electrolyte cannot be inhibited. In view of the above, 10 to 20% of silica sol is used in the ordinary batteries.

Figure 18:
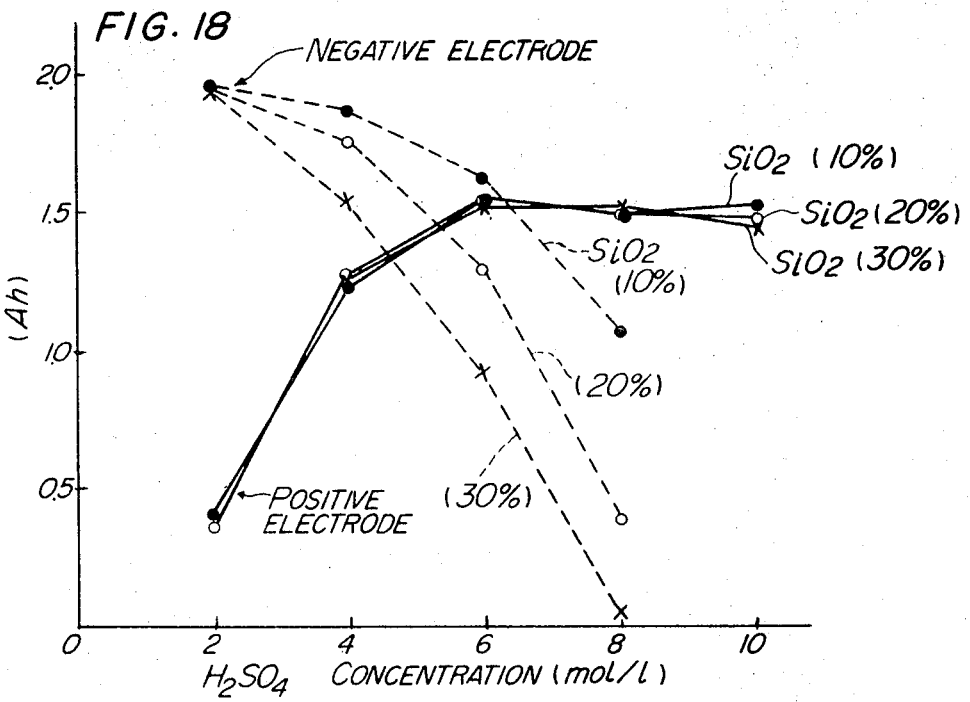
FIG. 18 is a diagram showing the relationship between the discharge capacity of a battery comprising silica gel as electrolyte and the concentration of $H_2SO_4$.
Figure 19:
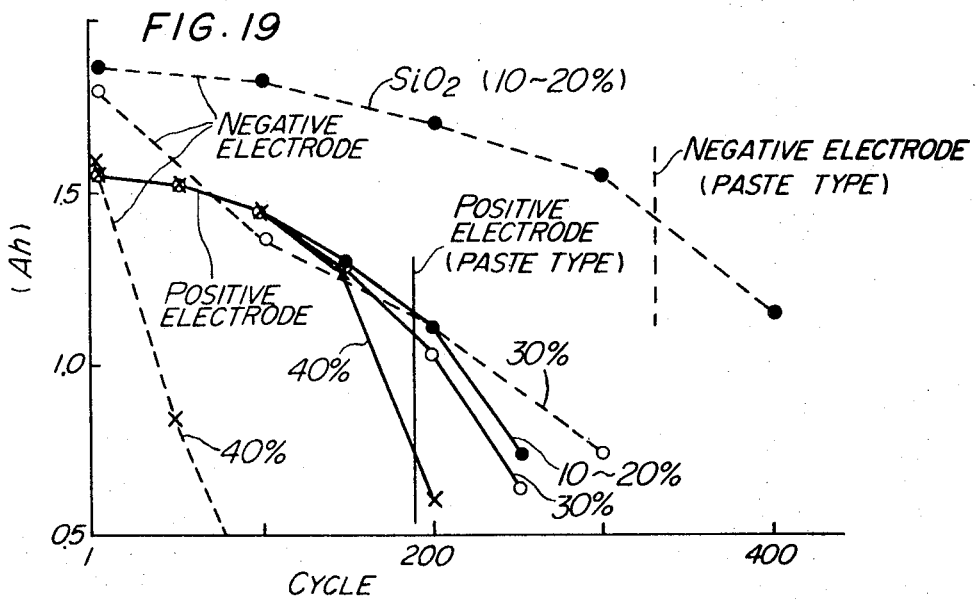
FIG. 19 is similarly a diagram showing the relationship between the concentration of $H_2SO_4$ and the discharge characteristic of the battery.

FIGS. 18 and 19 show the performance of a battery with respect to the amount of sulfuric acid added. Namely FIG. 18 shows the relationship between the $H_2SO_4$ concentration and the discharge capacities of a 0.3 mm. thick positive electrode and a 0.2 mm. thick negative electrode after continuously charging said electrodes for 1 week, and FIG. 19 shows the cycle characteristics of said electrodes. In FIG. 19, the $H_2SO_4$ concentration is 4 to 6, 8 and 10 mol/l. when the amount of $SiO_2$ is 10 to 20%, 30% and 40% respectively.

Figure 13:
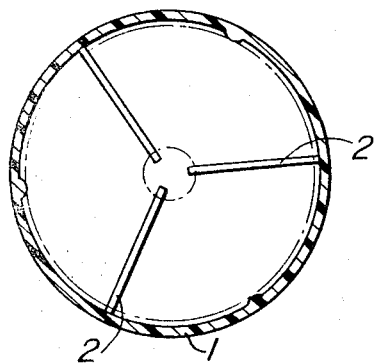
FIG. 13 is a transverse sectional view of the container of the battery.

The service life of a lead storage battery is frequently determined by the degree of delamination of the positive active material. So-called saddles are normally provided at the bottom of the container to prevent shorting caused by the precipitate. The number of such saddles should of course be reduced to minimum and in case of a rectangular container two of such saddles are usually provided in parallel relation. In case of a cylindrical container, it is desirable to arrange three saddles radially, with the inner ends thereof spaced from the center of the container, as shown in FIGS. 12 and 13. The height of the saddle is only required to be 2 to 3 mm. because the amount of precipitate can markedly be reduced by the use of a gelatinous electrolyte.

As has been described above, according to the present invention it is possible to obtain an electrode of high output density and light weight by such a simple method which comprises the steps of rolling and electrolytic etching. It is also possible to produce, in addition to box-shaped batteries of the conventional types, cylindrical batteries in which the electrodes are wound helically by making use of the flexibility thereof so as to attain effective use of the inside spacing. Moreover, by the combined use of the present electrodes with a gelatinous electrolyte, the service life of the electrodes, although thin in thickness, can be prolonged to the same extent as that of the conventional paste-type electrodes. It is also to be noted that the battery according to the invention, when provided with gas eliminating means, such as an oxygen-hydrogen combining catalyst, fulfills substantially all of the requirements for cordless battery. Thus, the present invention is of great practical value.

What is claimed is:

1. A method of producing an electrode for lead storage battery, comprising rolling a lead-silver alloy to form a plate of a thickness of 0.1 to 0.5 mm., subjecting the rolled lead alloy plate to an electrolytic oxidation to form lead oxide and thereafter electrolytically reducing the lead oxide of the plate to the metal in dilute sulfuric acid.

2. A method of producing a positive electrode for lead storage battery, comprising rolling a Pb-Ag alloy containing 0.05 to 0.15% of silver to form a plate of a thickness of 0.1 to 0.5 mm., subjecting the rolled Pb-Ag alloy plate to an electrolytic oxidation to form lead axide and thereafter electrolytically reducing the lead axide of the plate to the metal in dilute sulfuric acid.

3. A method of producing a negative electrode for lead storage battery, comprising rolling a Pb-Ag alloy containing 0.05 to 0.15% of silver to form a plate of a thickness of 0.1 to 0.5 mm., subjecting the rolled Pb-Ag alloy plate to an electrolytic oxidation to form lead oxide, immersing the oxidized plate in a 0.45 to 9 M/l. aqueous solution of barium salt and then in sulfuric acid to form $BaSO_4$ on the surface thereof, and thereafter cationically reducing the lead oxide of the plate to the metal in the same sulfuric acid.

4. A method as defined in claim 1, in which said electrolytic oxidation is conducted in an electrolyte composed of 0.03 to 0.06 M $KClO_4$, 0.013 to 0.026 M $KClO_3$ and ½ to 1 N $H_2SO_4$, at a temperature of about 30±5° C., a current density of 8 to 16 ma./cm.$^2$ and a current conducting rate of 160 to 320 ma. h./cm.$^2$.

5. A lead storage battery comprising a positive electrode, a negative electrode and an electrolyte consisting of a lignin sulfonate-containing sulfuric acid, and having undergone the initial charging at a current density of 1 hour rate or higher, said positive electrode being produced by rolling a Pb-Ag alloy containing 0.05 to 0.15% of silver to form a plate of a thickness of 0.1 to 0.5 mm., subjecting the rolled Pb-Ag alloy plate to an electrolytic oxidation to form lead oxide and thereafter electrolytically reducing the lead oxide of the plate to the metal in dilute sulfuric acid, and said negative electrode being produced by rolling a Pb-Ag alloy containing 0.05 to 0.15% of silver to form a plate of a thickness of 0.1 to 0.5 mm., subjecting the rolled Pb-Ag alloy plate to an electrolytic oxidation to form lead oxide, after washing it with water immersing the oxidized plate in a 0.45 to 0.9 M/l. aqueous solution of barium salt and then in sulfuric acid to form $BaSO_4$ on the surface thereof and successively thereafter cationically reducing the lead oxide of the plate to the metal in the same sulfuric acid.

6. A lead storage battery as defined in claim 5, in which said electrolyte contains 1 g./l. of lignin sulfonate and said initial charging is effected by conducting an amount of electricity corresponding to about 400% of the discharge capacity at a current density of 1 hour rate or higher and then conducting an electricity at a current density of 10 to 20 hour rate for 5 to 10 hours.

7. A lead storage battery as defined in claim 5, in which a separator and a spacer are interposed between said positive and negative electrodes with said spacer located adjacent the positive electrode and the laminate thus formed is wound helically to form an electrode group and disposed in a cylindrical container.

8. A lead storage battery as defined in claim 7, in which said separator consists of a non-woven fabric of polyvinyl chloride coated with a mixture of diatomaceous earth and an emulsion of vinyl chloride-vinyl acetate copolymer, and said spacer comprises acidproof, oxidation-proof synthetic resin filaments interlaced and melt-bonded with each other at the intersections.

9. A lead storage battery as defined in claim 5, in which said electrodes each have a lead lead wire welded thereto, said lead wire being covered with an acidproof resin tube, and the weld between said lead wire and said electrode is covered with an acidproof, oxidation-proof tape.

10. A lead storage battery as defined in claim 5, in which said electrolyte consists of an amount of sulfuric acid required for discharge, 10 to 20% of silica sol and an amount of sulfuric acid required for gelatinizing said sol.

References Cited

UNITED STATES PATENTS 2,658,097  11/1953  Orsino _____ 136—27
3,351,445  11/1967  Fielder et al. _____ 136—27

WINSTON A. DOUGLAS, Primary Examiner

C. F. LE FEVOUR, Assistant Examiner

U.S. Cl. X.R.
136—13, 27